April 24, 1951 C. A. BROWN 2,550,326

PLANOGRAPHIC PRINTING

Filed Jan. 12, 1949

INVENTOR.
Clarence A. Brown

BY Owen & Owen

ATTORNEYS

Patented Apr. 24, 1951 2,550,326

UNITED STATES PATENT OFFICE 2,550,326

PLANOGRAPHIC PRINTING

Clarence A. Brown, Toledo, Ohio, assignor to Jones Graphic Products Company, Albuquerque, N. Mex., a corporation of New Mexico Application January 12, 1949, Serial No. 70,460

12 Claims. (Cl. 154—46)

This invention relates to planographic printing, such as is described, for example, in the patent to Toland et al. for Photographic Plate Process, issued January 19, 1943, Patent No. 2,309,027. More particularly the patent relates to a surface coating or preparation to receive a light sensitive coating.

The object of the invention is to provide a surface coating to receive the light sensitive coating into which the light sensitive coating will penetrate to a certain extent and, when the ingredients are properly proportioned, the water repellent areas will shade into the water receptive areas gradually so that shaded printing may be produced.

In planographic printing, as commonly carried out, a light sensitive film is exposed to light passed through a suitable negative. The light causes chemical reaction in the sensitive film to render it insoluble. After proper exposure to the light the unexposed portion of the light sensitive film is washed off. Thereupon the ink will be repelled over the hydrophilic surfaces, but will cling to the surfaces carrying the light hardened portion of the film. As ordinarily carried out, there is a sharp line between the printing plate that carries the hardened film and that which does not have a film thereon, there being no gradual shading from the black portion to the white portion of the resultant printed paper.

I have found that by use of a properly composed and proportioned foundation layer to which the light sensitive film is applied, the light sensitive film will penetrate the foundation layer to a certain extent and upon exposure to light the light sensitive solution will be hardened to different degrees in accordance with the amount of light applied, and between the completely inked receptive and the completely ink repellent surfaces there may be a shaded decrease due to the hardened light sensitive matter in the surface of the foundation even where the light sensitive film is not exposed sufficiently to produce a continuous inked attractive layer. In this way shaded printed matter may be produced without the necessity of the usual half-tone or line negative process. It is, of course, apparent that if a sharply contrasted negative is used, a sharply contrasted printing plate will result in the usual manner.

The present invention also provides a printing sheet that is chemically stable and that does not deteriorate on standing or in use as do presently known sheets. The present sheet thus retains many of the advantages of metal plates without the high investment required thereby.

I have also devised a sheet to which the foundation layer may be applied which has particular advantages when combined with the foundation layer described. The details of the invention will be described in connection with the accompanying drawings forming a part of this specification, in which—

Figure 1:
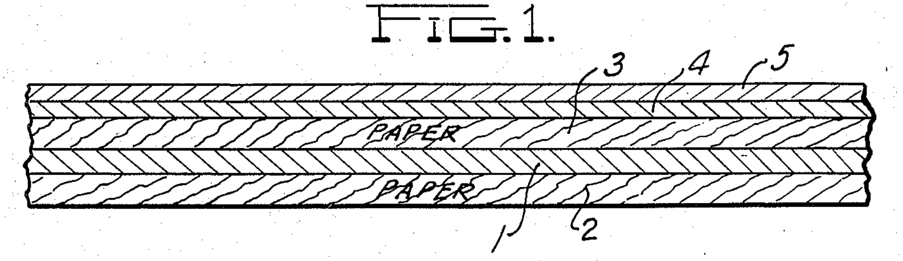
Figure 2:
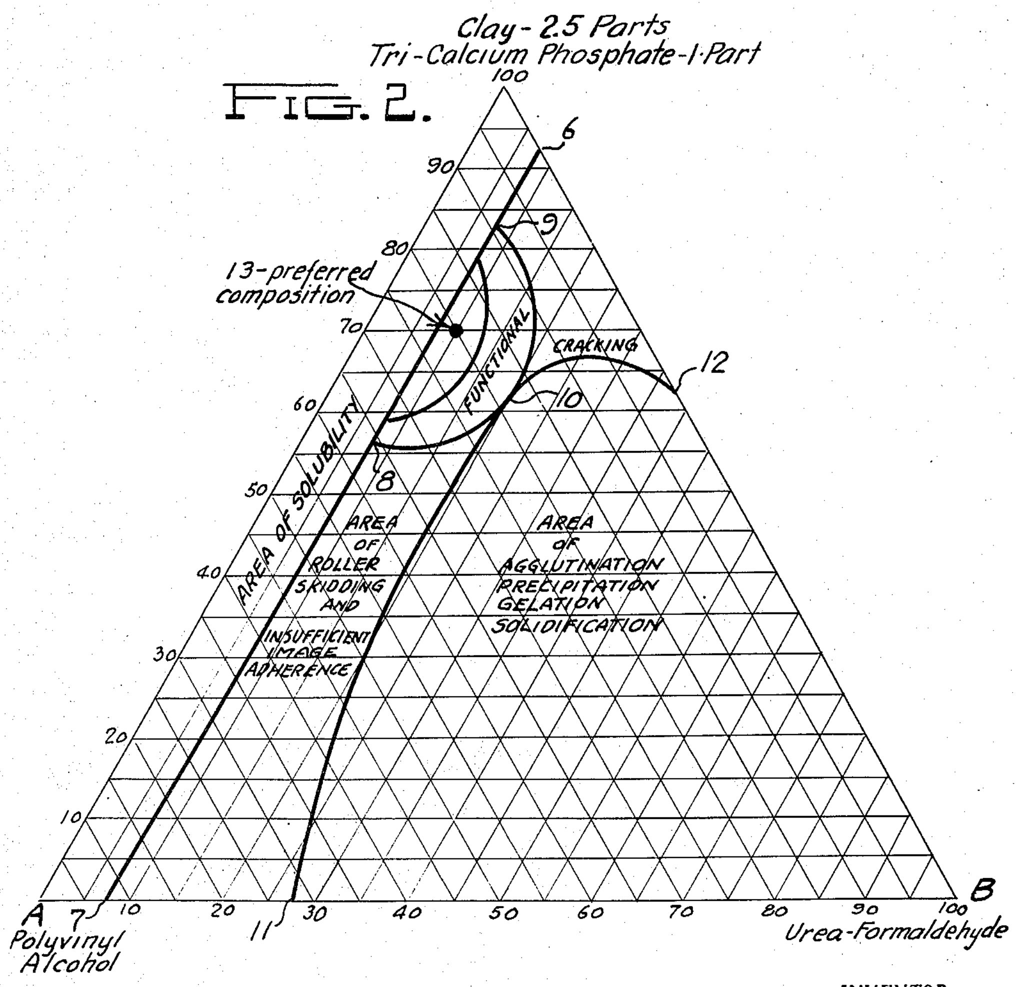

Fig. 1 is a cross-section of a planographic printing sheet in accordance with my invention, with the thickness of the various layers exaggerated for purposes of illustration; Fig. 2 is a triaxial diagram indicating proportions of certain ingredients in my improved foundation layer.

In Fig. 1 there is shown a laminated structure comprising a sheet of metal foil 1 and paper layers 2 and 3, one on each side of the foil. The paper is adhered to the foil by any well-known appropriate adhesive. The paper sheets are treated with resin or otherwise sufficiently to reduce the affinity for water and prevent them from becoming too soft for use. Some commercial papers are already sufficiently water resistant for the purpose. To the surface of sheet 3 there is applied my new foundation coating 4 over which the light sensitive film 5 is applied. The paper sheets adhered to the metal foil are retained by the foil in their original dimensions, so that printing designs placed thereon are accurately positioned and successive designs of different colored ink or the like may be applied with accurate registration.

The foundation sheet may be prepared in the following way:

Preferably three solutions are prepared and then mixed. A highly polymerized high saponification polyvinyl alcohol is dissolved in water at the ratio of one ounce of the polyvinyl alcohol to 20 ounces of distilled water for Solution 1.

Solution 2 may consist of 10 ounces of distilled water with 9 grains sodium acid pyrophosphate, 2½ ounces clay and 1 ounce tri-calcium phosphate.

Solution 3 may consist of a water soluble type of urea-formaldehyde plastic, 1½ ounces in 1 ounce of distilled water.

The three solutions are then mixed together and a sufficient quantity of phosphoric acid is provided to bring the acidity of the mixture to 4.2 pH. This solution is then coated onto the surface of paper member 3 and allowed to cure for several days at a temperature of 80° to 100° F. After this, sheet 3 may be applied to the metal foil. The light sensitive film is then applied over the foundation film and exposed to light in the usual way, the unreacted light sensitive film being removed leaving the reacted portion of the film, including the shaded portions where some of the light sensitive material which penetrated the foundation coat is reacted, although not sufficiently to make the surface completely water-repellent.

The operative proportions of the chief ingredients are indicated in Fig. 2, drawn as a triaxial diagram of a mixture of the urea formaldehyde plastic, the polyvinyl alcohol and the mixture of clay and tri-calcium phosphate. The minimum satisfactory amount of urea-formaldehyde plastic is indicated at about 7% along the line 6, 7. The operative amount of tri-calcium phosphate and clay is indicated by the portion of line 6, 7 which lies between points 8 and 9. The largest permissible amount of urea-formaldehyde plastic is indicated by point 10 at about 20%. The permissible amount of the tri-calcium phosphate-clay mixture, as indicated by points 8 and 9, varies from 56% to 82%, and the amount of polyvinyl alcohol indicated by the same points is 19% to 36%. The satisfactory proportions are, therefore, indicated by the regions enclosed in lines 8, 9, 10, 8. The preferred proportions are 10% of the urea-formaldehyde plastic, 70% of tri-calcium phosphate-clay mixture and 20% of polyvinyl alcohol. The area to the left of line 6, 7 indicating less than 7% urea-formaldehyde is not rendered sufficiently insoluble to be desirable. The urea to the right of line 11, 12 indicating the higher proportions of urea-formaldehyde indicates a region which is too stiffly plastic for desirable application as a film, ranging from undesirable agglutination to complete solidification. The area enclosed by lines 12, 10, 9, 6, 12 comprise proportions which set too stiffly and are liable to crack on bending. The area bounded by lines 7, 8, 10, 11, 7 indicates mixtures where the printed image does not adhere satisfactorily to the foundation coating. As the mixture within the preferred area approaches the boundary lines 8, 9, 10, 8, the resultant mixture approaches the characteristics of the undesirable areas on the outside of the respective lines. It will, therefore, be understood that while some variation may be made, the preferred mixture is that indicated at point 13, or as previously stated, 10% urea-formaldehyde, 20% polyvinyl alcohol and 70% tri-calcium phosphate and clay.

The water included is sufficient to make the solution properly fluent for application, and may be varied considerably, using about 85% of water by weight forms a readily applicable solution, with considerable variation from that proportion permissible.

What I claim is:

1. A solution for use in forming a coating on planographic printing sheets suitable for receiving a light sensitive coating, said solution being an aqueous solution containing as its essential ingredients in the proportions of 7% to 20% of water-soluble urea-formaldehyde plastic, 56% to 82% of a mixture of tri-calcium phosphate and clay in the proportions of 1 part tri-calcium phosphate to 1 to 3 parts clay and from 19% to 36% highly polymerized high saponification polyvinyl alcohol, the pH value of said solution being between 3.6 and 5.3.

2. A planographic printing sheet having a layer supporting a design formed by hydrophilic and hydrophobic portions, said layer being the residue of a reacted solution, the essential ingredients and their proportions being 7% to 20% of water-soluble urea-formaldehyde plastic, 56% to 82% of a mixture of tri-calcium phosphate and clay in the proportions of 1 part tri-calcium phosphate to 1 to 3 parts clay and from 19% to 36% highly polymerized high saponification polyvinyl alcohol, the pH value of said solution being between 3.6 and 5.3.

3. A planographic printing sheet consisting of a sheet of metal foil with a sheet of water resistant paper adhered to each face of the foil and a layer on the outer surface of one of the sheets of paper, said layer being the residue of an aqueous solution dried onto the paper and the essential ingredients of the solution and their proportions being 7% to 20% of water-soluble urea-formaldehyde plastic, 56% to 82% of a mixture of tri-calcium phosphate and clay in the proportions of 1 part tri-calcium phosphate to 1 to 3 parts clay and from 19% to 36% highly polymerized high saponification polyvinyl alcohol, the pH value of said solution being between 3.6 and 5.3.

4. A solution for use in forming a coating on planographic printing sheets suitable for receiving a light sensitive coating, said solution being an aqueous solution containing as its essential ingredients in the proportions of approximately 10% of water-soluble urea-formaldehyde, 70% of a mixture of 1 part tri-calcium phosphate to 1 to 3 parts clay and 20% highly polymerized high saponification polyvinyl alcohol.

5. A planographic printing sheet having a layer supporting a design formed by hydrophilic and hydrophobic portions, said layer being the residue of a reacted solution, the essential ingredients and their proportions being approximately 10% of water-soluble urea-formaldehyde plastic, 70% of a mixture of 1 part tri-calcium phosphate to 2.5 parts clay and 20% highly polymerized high saponification polyvinyl alcohol.

6. A planographic printing sheet consisting of a sheet of metal foil with a sheet of water resistant paper adhered to each face of the foil and a layer on the outer surface of one of the sheets of paper, said layer being the residue of an aqueous solution dried onto the paper, and the essential ingredients of the solution and their proportions being approximately 10% of water-soluble urea-formaldehyde plastic, 70% of a mixture of 1 part tri-calcium phosphate to 2.5 parts clay and 20% highly polymerized high saponification polyvinyl alcohol.

7. A solution for use in forming a coating on planographic printing sheets suitable for receiving a light sensitive coating, said solution being an aqueous solution containing as its essential ingredients water-soluble urea-formaldehyde plastic, a mixture of tri-calcium phosphate and clay and highly polymerized high saponification polyvinyl alcohol in the proportions indicated by the area 8, 9, 10, 8 on diagrammatic Fig. 2.

8. A planographic printing sheet having a layer supporting a design formed by hydrophilic and hydrophobic portions, said layer being the residue of a reacted solution, the essential ingredients being water-soluble urea-formaldehyde plastic, a mixture of tri-calcium phosphate and clay and highly polymerized high saponification polyvinyl alcohol in the proportions indicated by the area 8, 9, 10, 8 on diagrammatic Fig. 2.

9. A planographic printing sheet consisting of a sheet of metal foil with a sheet of water resistant paper adhered to each face of the foil and a layer on the outer surface of one of the sheets of paper, said layer being the residue of an aqueous solution dried onto the paper and the essential ingredients of the solution being water-soluble urea-formaldehyde plastic, a mixture of tri-calcium phosphate and clay and highly polymerized high saponification polyvinyl alcohol in the proportions indicated by the area 8, 9, 10, 8 on diagrammatic Fig. 2.

10. An aqueous solution for forming a coating on planographic printing sheets suitable for receiving a light sensitive coating, said solution containing as its essential ingredients water-soluble urea-formaldehyde plastic, a tri-calcium phosphate-clay mixture and highly polymerized high saponification polyvinyl alcohol in the proportions defined by the area 8, 9, 10, 8 on diagrammatic Fig. 2, and phosphoric acid sufficient to provide a pH of between 3.6 and 5.3.

11. A planographic printing sheet having a layer supporting a design formed by hydrophilic and hydrophobic portions, said layer being the residue of a reacted solution in which the essential ingredients are water-soluble urea-formaldehyde plastic, a tri-calcium phosphate-clay mixture and highly polymerized high saponification polyvinyl alcohol in the proportions defined by the area 8, 9, 10, 8 on diagrammatic Fig. 2, and phosphoric acid sufficient to provide a pH of between 3.6 and 5.3.

12. A planographic printing sheet consisting of a sheet of metal foil, a sheet of water resistant paper adhered to each face of the foil, and a layer on the outer surface of one of the sheets of paper, said layer being the residue of an aqueous solution dried onto the paper and the essential ingredients of the solution being water-soluble urea-formaldehyde plastic, tri-calcium phosphate-clay mixture and highly polymerized high saponification polyvinyl alcohol in the proportions defined by the area 8, 9, 10, 8 on diagrammatic Fig. 2, and phosphoric acid sufficient to provide a pH of between 3.6 and 5.3.

CLARENCE A. BROWN.

REFERENCES CITED

The following references are of record in the file of this patent:

UNITED STATES PATENTS

| Number | Name | Date |
|---|---|---|
| 2,230,981 | Toland | Feb. 4, 1941 |
| 2,311,889 | Toland | Feb. 23, 1943 |